(No Model.) 3 Sheets—Sheet 1.
P. W. DOHERTY.
ORE SEPARATOR.
No. 367,095. Patented July 26, 1887.
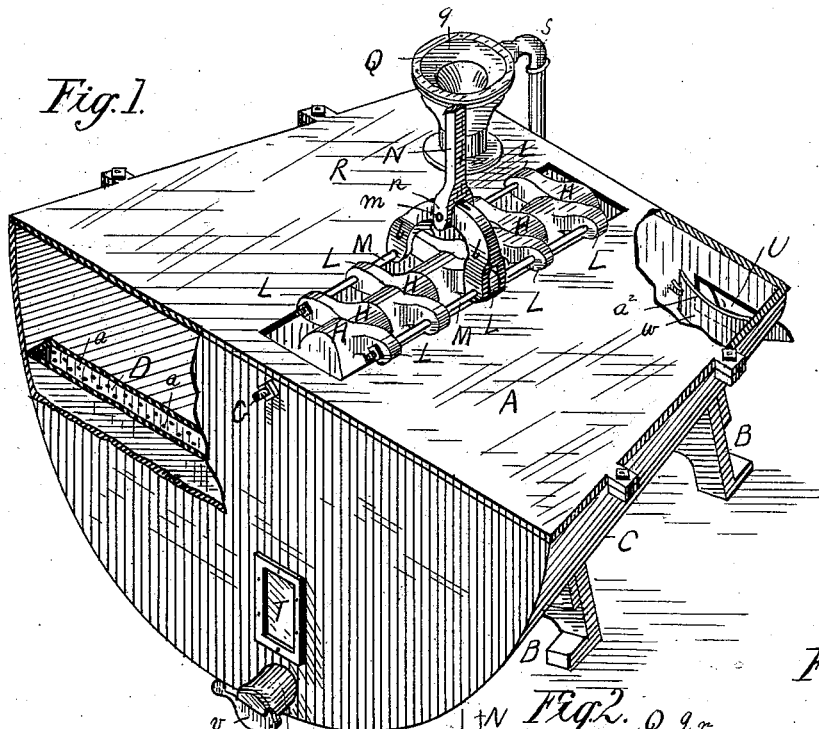
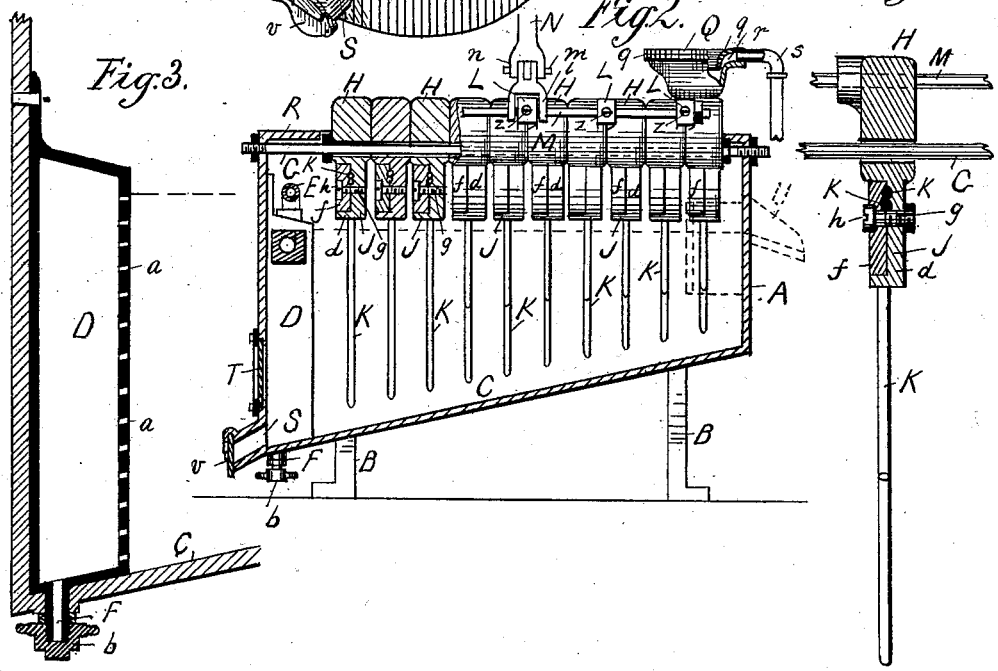
Witnesses.
Wm. E. Bellows
Frank R. Mitchell
P. W. Doherty,
Inventor;
per Brown Bros
Attorneys.

(No Model.)

P. W. DOHERTY.
ORE SEPARATOR.

No. 367,095. Patented July 26, 1887.

Witnesses.
Wm. S. Bellows
Frank B. Mitchell

P. W. Doherty,
Inventor;
per Brown Bros,
Attorneys.

(No Model.) 3 Sheets—Sheet 3.

P. W. DOHERTY.
ORE SEPARATOR.

No. 367,095. Patented July 26, 1887.

Witnesses.
Wm. A. Bellows
Frank B. Mitchell

P. W. Doherty,
Inventor;
per Brown Bros.,
Attorneys.

N. PETERS, Photo-Lithographer, Washington, D. C.

UNITED STATES PATENT OFFICE.

PATRICK W. DOHERTY, OF BOSTON, MASSACHUSETTS.

ORE-SEPARATOR.

SPECIFICATION forming part of Letters Patent No. 367,095, dated July 26, 1887.

Application filed April 20, 1882. Serial No. 92,379. (No model.)

*To all whom it may concern:*

Be it known that I, PATRICK W. DOHERTY, of Boston, in the county of Suffolk and State of Massachusetts, have invented certain new and useful Improvements in Ore-Separators, of which the following is a full, clear, and exact description.

This invention relates to machines for separating or concentrating the heavier from the lighter particles of ores or other comminuted substances; and it consists in the several novel features of construction and combinations of parts, hereinafter fully set forth, and then definitely pointed out in the claims following this specification.

In the accompanying drawings is illustrated a machine for separating or concentrating ores, &c., having in substance all the several features of this invention.

Figure 5:
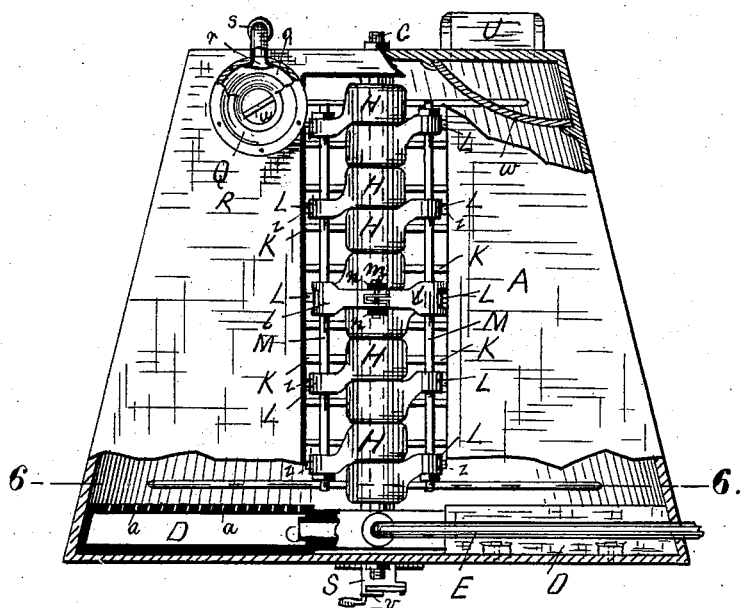
Figure 6:
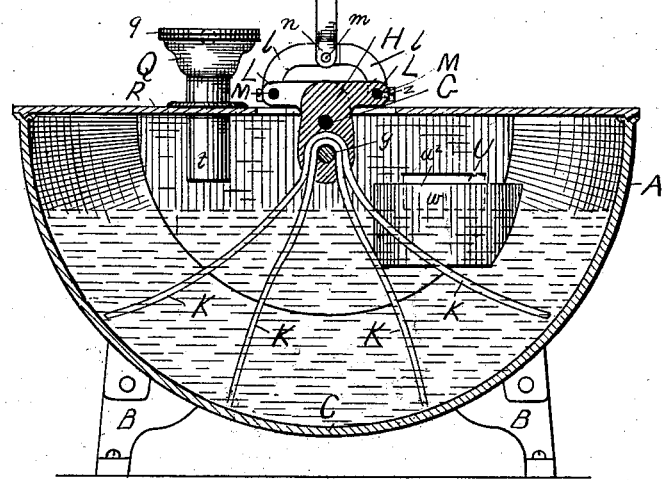
Figure 7:
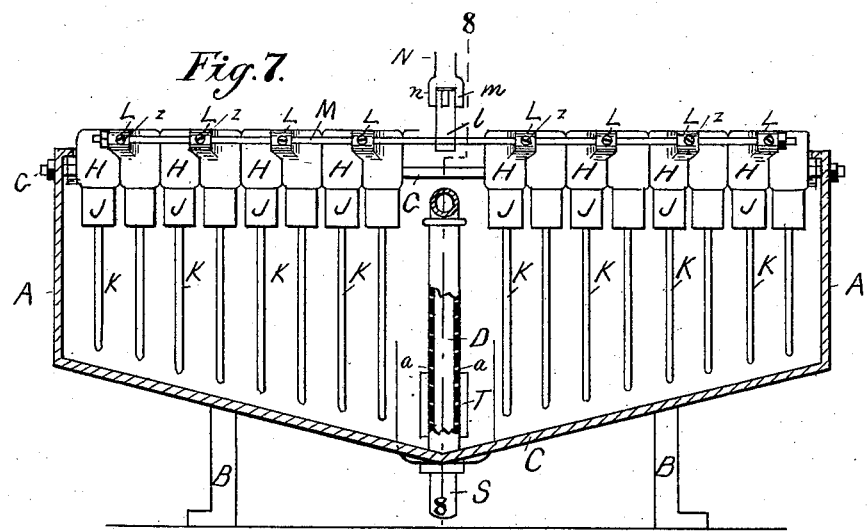
Figure 8:
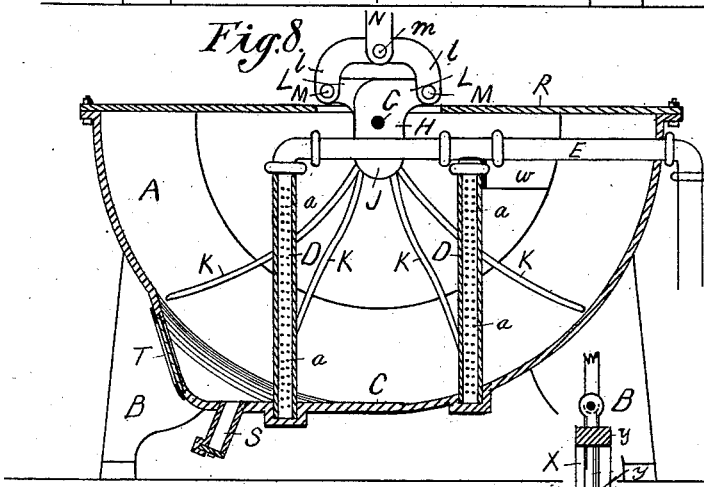
Figures 9, 10:
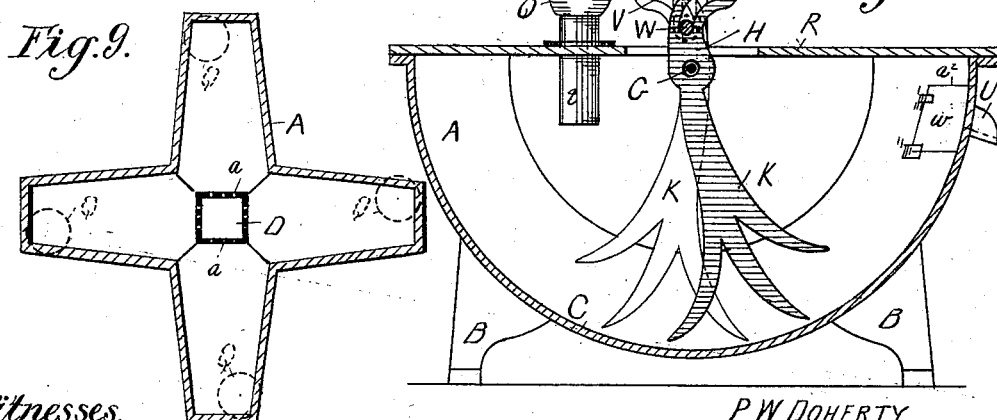

Figure 1 is a perspective view with some portions broken out. Fig. 2 is a central longitudinal vertical section. Figs. 3 and 4 are enlarged views in detail. Fig. 5 is a plan view, with some parts broken out, in horizontal section. Fig. 6 is a transverse vertical section on line 6 6, Fig. 5. Fig. 7 is a central longitudinal vertical section illustrating another form of the ore-receiving tank. Fig. 8 is a transverse vertical section on line 8 8, Fig. 7. Fig. 9 is a diagram in horizontal section showing another form of the ore-receiving tank. Fig. 10 is a transverse vertical section illustrating a modification in the mechanism for rocking or oscillating the agitators.

In the drawings, A represents the ore-receiving tanks, made of metal or other suitable material, of suitable dimensions and supported on legs B or other proper supports. Each tank has a bottom, C, semi-cylindrical in cross-section, and which converges toward one end, as seen in Fig. 1. Fig. 7 shows two tanks of this form joined at their larger ends and open to each other, and Fig. 9 illustrates four tanks of the same shape joined at their larger ends and all open to each other.

The tank A is provided with a water-receiving chamber or chambers, D, made rectangular or other suitable shape in horizontal cross-section, and provided with a series of perforations or jet-holes, *a*. The water-chambers D are located in the tank at the lowermost end of its inclined bottom C, and preferably their perforations or jet-holes *a* have a direction at the lowest portion of the chamber corresponding substantially with the upward inclination of the bottom of the tank, and at the top portion of the chamber they correspond substantially with the horizontal level of the water and ore in said tank, and between these two points they have a direction proportionately changing from the incline of the bottom to the water-level of the tank. These water-chambers D are preferably made separate from the tank and of brass or other non-corrosive metal, and they are to be fixed in position in the tank in any suitable manner. Again, preferably, the perforations *a* of the chambers should cover or include a surface equal to the full depth of the water and ore in the tank.

E is a pipe for the supply of water to the water-chambers D, and F an opening in the lower portion of each, through which to clear it of any refuse, said opening being closed by a screw plug or stopper, *b*, or other suitable device.

The ore-tank near its top and in the direction of its length and coincident with its central or axial line from end to end, Figs. 1, 2, 5, 6, 7, 8, and 10, is provided with a horizontal shaft or rod, G, which is fixed at each end or in any suitable manner made stationary in the ends or heads of the tank. This shaft carries a series of hubs, H, which are arranged alongside of each other, and each is free to rotate upon said shaft. Each hub has an arm, J, made in two leaves, *d* and *f*, secured together by a screw and headed bolt, *g*, and screw-nut *h*, applied so as to offer no obstruction to the free vibration of the hubs upon the shaft in either direction. Each hub H carries a series of agitating tines or prongs, K. These tines or prongs are made of a wire or of a rod of metal looped about the axis of the fastening bolt or screw *g* of the hub and located between the contiguous faces of the two leaves *d f*, forming the arm J of the hub H. These leaves at their contiguous faces are preferably grooved, as shown in Fig. 4, to receive said tines, and thus when the two leaves are fastened together by the screw or bolt *g* they secure a better hold upon the tines or prongs K and prevent their slipping between the leaves. The tines extend substantially radially relative to the axis of the fulcrum rod or shaft G of the hubs H, and they are each of a length to follow substantially the concave or curved or inclined face of the bottom C of the tank in which they are located. As shown, each hub carries four of the tines or prongs K, above described, each two prongs of the four being made of a continuous piece of a wire or rod doubled between its two ends.

Each hub H has a crank-arm, L, projecting from one side thereof, and as the hubs are arranged these arms project alternately upon opposite sides relative to the axis of the fulcrum-shaft G, and the several crank-arms upon the same side of the axis of the fulcrum-shaft G are joined by a common rod, M, fixed against turning in each of the said crank-arms, and both of these rods M, intermediate of their length, are connected together by two arms, $l\ l$, each journaled at one end upon one of the rods M, and at their other ends said rods are hinged together and suspended by the pivot $m$, between the forked ends $n$ of a vertical pitman-rod, N, which is eccentrically hung to a driving-shaft, P, which is to be driven in any suitable manner.

Q is a hopper, through which to enter the ore to be separated or concentrated in the receiving-tank A. The hopper is preferably located at the higher end of each inclining bottom and near one corner of the tank. The hopper is made of a basin shape, as shown, and the basin has a chute or conduit, $t$, at its lower end, which passes through the cover R and into the chamber of the ore-tank, and said basin at its upper and open end has a surrounding flange or rim, $q$, which is made preferably of a flexible material, such as lead. This flange $q$, with the inner periphery of the basin, makes a channel, $r$, around the basin, which, by a pipe, $s$, is in communication with a water-supply, so that the water entering said channel from said supply-pipe will be made to circulate through said channel and around the basin, and as it is discharged at the lower and open edge of said channel it will secure a distribution around all sides of the basin, passing in such distribution downward toward and into the chute $t$, which at its junction with the lower and contracted end of the basin it is intended to provide with a grating. (Not shown in the drawings.)

S is a discharge chute or conduit at the lower end of the tank in relation to its inclining bottom. This discharge-chute is for discharging the heavier particles of the ore from the ore-tank, and it is provided with a gate, $v$, suitably applied to be opened and closed from time to time, as may be desired.

T is a plate of glass or other transparent material located at the lower end of the tank in relation to its inclining bottom, for the purpose of observing the inside of the tank in the operation of the machine.

U is a chute leading from the upper or higher end of the ore-tank. This chute is for the discharge of the lighter portions, which are separated from the heavier portions of the ore, together with the water entered into the tank A in the operation of the machine, and the end of said chute opening into the tank is guarded by a fender, $w$, arranged to extend above and below the water-level of the tank, and thus to compel a passage under it of the lighter material and water on its way to escape at the chute.

The operation of the machine above described is as follows: The ore to be separated or concentrated, the heavier from the lighter particles, is fed into the hopper Q in any suitable manner, and by its entrance at the supply-pipe $s$ and the flow and distribution of water therein it is saturated with water, and in passing through the basin chute or conduit $t$ it is discharged into the ore-tank A, dropping to the bottom thereof. The ore being thus entered into the tank is agitated therein by the movements of the agitating tines or fingers K through the operation of the mechanism described as connecting their hubs with the driving-shaft P, and this movement of said tines or agitators is an oscillating or rocking one, and the two sets of tines rock in opposite directions from the axis of their common fulcrum-shaft G toward the sides of the tank and back again. While the ore is so agitated in the ore-tank, water in a series of streams or jets is entered into the tank from the water-chambers, passing through the perforations thereof. Consequently, with a continuous feed of ore into the ore-tank through the hopper Q, and a continuous rocking operation of the agitating tines or prongs K, together with a continuous flow of water in more or less separate streams from the water-chambers through the perforations thereof into and along the length of the ore-tank, the lighter portions or materials of the ore are caused to be separated from the heavier portions or materials. As said lighter portions are carried to the upper part of the tank, they pass off and are discharged at the discharge-chute U, and at the same time the heavier portions or materials are allowed to pass to the lower end of the inclined bottom C of the tank, to be there discharged, when proper, through the discharging-chute S.

The herein-described inclination of the bottom of the ore-tank, taken in connection with an arrangement of the water-supply for the water to enter the tank with an upward direction, corresponding substantially to the upward inclination of said bottom, is a feature of importance and advantage, for the reason that the water is enabled to do its work of separating or concentrating the lighter portions or materials of the ore at the upper part of the tank with ease and facility and with a comparatively light pressure of water, while the heavier portions or materials can freely pass to the lower part of the tank. The above is also, to a greater or less extent, true of the operations of the tank and of the passage of water through it when the tank is made tapering from end to end. Again, the oscillating agitators herein described not only agitate the mass of ore in the tank by passing through the same, as with all other agitators, but they also additionally agitate it by lifting and tumbling over its particles; and as said agitators are constructed and arranged it is plain they offer no practical or substantial obstruction to the passage or flow of the water or lighter particles of material to the upper part or level and of the heavier particles to the lower end of the ore-tank, each to be discharged or removed, as aforesaid.

If the flushing flange or "rim" $q$, as it may be termed, of the hopper is made of pliable metal—such as lead, as has been stated it is preferable to make it—it is apparent that the water-channel $r$, formed by it, may be readily expanded or contracted as may be desired or found necessary by simply opening out or closing in said flange or rim relative to the surface of the basin Q with ordinary tools— such as a knife or other blade to open it from, and a hammer or other similar tool to close it toward, the surface of the basin.

The entrance of the water into the ore-tank, as has been described, and as particularly shown, at the lower end of the inclined bottom is without doubt the best manner of so entering the water into the tank; but for the purposes of this invention it is plain that the same effect in substance and in principle may be obtained by arranging the water chambers or supplies for the entrance of such water in the tank at and along the sides of the tank, instead of at one end thereof, as has been particularly described and shown, taking care that the jets or stream of water from such side chambers or supplies have a direction substantially coincident with the taper and inclination in that direction of the bottom of and with the level of the water in, the tank as has been fully described in relation to the jets or streams of water when entered into the tank at one end thereof.

The tank shown in Figs. 1, 2, 5, and 6 has only one compartment of the form described, and the tank as shown in Fig. 7 two compartments of the same form, and as shown in Fig. 9 four compartments of the same form; but it is plain that the number of compartments is unlimited, and whatever number there is the operation of either is practically not affected.

When the apparatus is provided with a series of compartments, as has been shown and described, it is better that each one thereof should have an ore-feeding hopper and ore-agitators of its own; and these several separate ore-agitators may be arranged to be driven from a common or from separate driving-shafts or other suitable driving mechanism, while at the same time the several inclinations of the bottoms or sides of the tank may be adapted for the discharge of the heavier materials through one and the same chute, the discharge of the lighter materials being obtained through a single chute or through separate chutes for each compartment of the tank.

In Fig. 10 the agitating tines or prongs K are shown of a different shape, and each has a cam-slot, V, through all of which passes a horizontal rod, W. This rod is arranged to be moved by attaching it to another rod or frame, X, arranged to slide in vertical guideways $y$, and eccentrically connected to a driving-shaft.

Agitators constructed and arranged for operation as has been hereinbefore particularly described are preferable and advantageous, because of their simplicity and economy in manufacture and freedom from friction.

The hubs H of the agitators K are fastened to their rods M, preferably by set-screws $z$, so as to enable them to be set and permit them to be removed from or inserted for operation as desired. Again, the tines making the agitators can be removed, according to the extent of agitation of the ore required, and collars substituted and attached to the fulcrum-shaft on which the agitator-hubs work to keep them from movement along the length of the fulcrum-shaft.

The fender $w$, located at the discharge or outlet U for the lighter portions of the ore separated in the tank, preferably is arranged in any suitable manner to be adjusted as to the height of its lower edge relative to the level of the water and ore in the tank, the upper edge, $a^2$, of the fender being always above the level of the water and ore in the tank.

Having thus described my invention, what I claim, and desire to secure by Letters Patent, is—

1. A tank semi-cylindrical in cross section and converging toward one end, constructed with a chamber having jet-holes for entering water in separate streams into the tank, and with upper and lower discharge-chutes, in combination with agitators and means for oscillating them, substantially as described.

2. A tank semi-cylindrical in cross-section and converging toward one end and provided with upper and lower discharge-chutes U and S, in combination with a stationary shaft, G, having agitators K, and means to oscillate them thereon, substantially as described.

3. In an ore-separating machine, the combination, with the agitators K, of the hubs H, having arms J, made in two leaves, between which leaves the agitators are clamped, substantially as described.

In testimony whereof I have hereunto set my hand in the presence of two subscribing witnesses.

PATRICK W. DOHERTY.

Witnesses:
EDWIN W. BROWN,
WM. S. BELLOWS.